United States Patent
Braun et al.

(10) Patent No.: US 7,564,703 B1
(45) Date of Patent: Jul. 21, 2009

(54) METHOD AND APPARATUS FOR SYNCHRONIZED PARALLEL OPERATION OF PWM INVERTERS WITH LIMITED CIRCULATING CURRENT

(75) Inventors: Dennis Braun, Brookfield, WI (US); Rangarajan Tallam, Germantown, WI (US); Ajith Wijenayake, New Berlin, WI (US); Robert J. Johnson, Kewaskum, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 280 days.

(21) Appl. No.: 11/787,722

(22) Filed: Apr. 17, 2007

(51) Int. Cl.
*H02M 5/40* (2006.01)
*H02M 5/45* (2006.01)
*H02M 1/14* (2006.01)

(52) U.S. Cl. .............................. 363/34; 363/35; 363/37; 363/39; 363/40; 363/44

(58) Field of Classification Search .................... 363/34, 363/35, 37, 39, 40, 44, 47, 48
See application file for complete search history.

(56) References Cited

U.S. PATENT DOCUMENTS

| | | | | |
|---|---|---|---|---|
| 6,288,915 | B1 * | 9/2001 | Stemmler et al. ............. | 363/34 |
| 6,838,860 | B2 * | 1/2005 | Huggett et al. ................ | 322/46 |
| 7,477,531 | B2 * | 1/2009 | Wei et al. ...................... | 363/37 |
| 2003/0012038 | A1 * | 1/2003 | Welches et al. ............... | 363/34 |
| 2007/0030706 | A1 * | 2/2007 | Wei et al. ...................... | 363/44 |
| 2007/0030707 | A1 * | 2/2007 | Wei et al. ...................... | 363/44 |

* cited by examiner

*Primary Examiner*—Bao Q Vu
(74) *Attorney, Agent, or Firm*—Quarles & Brady LLP; Alexander R. Kuszewski (57) ABSTRACT

An apparatus and method for converting DC voltage across positive and negative DC buses to three phase AC voltages on first, second and third AC output lines, the method comprising the steps of providing first and second three phase inverters that include a first subset of inverter switches and a second subset of inverter switches, respectively, linking a first choke in series with the first three phase inverter between the positive and negative DC buses and the AC output lines, linking a second choke in series with the second three phase inverter between the positive and negative DC buses and the AC output lines and synchronously controlling the first and second inverter switch subsets so that switching of first and second inverter switch subsets is substantially synchronized among the three phases.

23 Claims, 4 Drawing Sheets

METHOD AND APPARATUS FOR SYNCHRONIZED PARALLEL OPERATION OF PWM INVERTERS WITH LIMITED CIRCULATING CURRENT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to parallel inverter structures with common DC input and more specifically to an apparatus for reducing circulating currents that result when inverters are linked in parallel.

A typical three phase inverter structure includes six switching devices (e.g., IGBTs) that are arranged between positive and negative DC buses of a rectifier apparatus to form first, second and third switch legs where each leg includes a pair of switches. The first leg includes first and second switches arranged in series, the second leg includes third and fourth switches in series and the third leg includes fifth and sixth switches where nodes between each switch pair are linked to different phases of a three phase load. The above topology is generally referred to as a single inverter structure. By controlling the switching cycles of the six switches the DC voltage across the DC buses is converted into three phase AC voltage that is delivered to the load.

When power requirements beyond the capability of a large single inverter structure are required, one solution has been to arrange single inverter structures in parallel. In this regard, a typical parallel inverter assembly includes two or more single inverter structures that are linked to positive and negative DC buses of a rectifier where the inverter output lines are linked at common coupling points to a load.

As well known in the controls industry, within a parallel inverter structure, during operation, circulating currents typically result due to differences in gate timing signals, switch turn on times, etc.

In addition to differential-mode and common-mode currents that normally flow in a single inverter structure, circulating currents typically flow between the inverters in a parallel assembly where the circulating currents also have common-mode and differential-mode components. The main causes for circulating currents include (1) asynchronous PWM signals (e.g., due to misaligned carrier signals and/or differences in modulating signals); (2) differences in power device characteristics (e.g., differences in switch voltage drops and device switching times; (3) imperfect inverter layouts (e.g., signal delays and mismatched impedances due to unequal cable lengths); and (4) control issues (e.g., inaccurate or unbalanced dead-time compensation, etc.).

Several techniques to synchronize PWM pulse patterns and thereby reduce circulating currents in parallel inverter structures are well known in the art. For instance, one PWM synchronizing hardware solution uses a single controller to generate PWM gating signals for each parallel arranged inverter and related methods to transmit the signals to the individual inverters. Another PWM synchronizing solution includes independent controllers to synchronize phases of PWM carrier signals and operates in a master-slave mode to ensure identical modulating signals. Even with synchronized operation, high frequency circulating currents have been known to persist due to signal delays, differences in switching characteristics of power semi-conductors and inverter dead time.

Where residual circulating currents persist and are appreciable, inter-phase AC reactors have been positioned between output phases of parallel inverters to provide impedance to both high frequency common-mode and differential-mode circulating currents to thereby limit both the magnitude and rate of change of the circulating currents. In these cases inter-phase reactor size depends to a great extent on the degree of mismatch in switching between inverters and additional inverter switching control is required to ensure current sharing among the inverters at low frequencies. Often, despite synchronizing efforts, large reactors have been required to deal with residual circulating currents.

It is also well-known that if inverter PWM switching among parallel linked inverters is synchronized, parallel inverters can be de-rated and operated in parallel without requiring a reactor. Here, parallel inverter layout can be designed such that inherent impedances associated with system linkages (e.g., bus work, cabling, etc.) are sufficient to limit circulating currents to a reasonable level so that reactors and the like are not required. In general de-rating should be minimized or avoided wherever possible and therefore solutions like this one are typically considered less than optimal.

In addition to hardware PWM synchronizing solutions, some software solutions have been developed. For example, one PWM synchronizing software solution includes detecting circulating current at a PWM frequency using a demodulation operation and using the detected circulating current to adjust the phase of a carrier signal used to drive one of the inverters. This solution has been used to operate two standard adjustable speed drives (ASDs) in parallel where PWM patterns cannot be synchronized using some other method and requires high impedance at the AC output.

In some cases PWM synchronization is not possible due to hardware or controller constraints. In cases where PWM synchronization is not possible, circulating currents in parallel inverter structures have been limited by using choke structures.

One known choke configuration for limiting circulating currents includes DC common-mode chokes between a common DC link and each of at least two parallel inverters, with differential-mode AC output chokes positioned at the output ends of each inverter (i.e., between each inverter output and common AC coupling points). Another known choke configuration for limiting circulating currents includes complex integrated common-mode and differential-mode chokes positioned at the output ends of each parallel linked inverter (i.e., between each inverter output and common AC coupling points). In each of these configurations that include chokes, the AC output common-mode currents are sensed and used to independently control each of the parallel linked inverters in an effort to regulate circulating currents. While these solutions provide acceptable operating results, unfortunately, because the common and differential mode circulating currents tend to be large where inverter switching is not synchronized, large differential-mode and common-mode inductances are required.

Thus, except where inverters are de-rated appreciably, in all known cases where inverters are linked in parallel, some type of choke has been required at the output ends of parallel inverters to limit common mode and/or differential mode circulating currents to acceptable levels. As well known in the industry, chokes for high power inverters tend to be extremely large and heavy, and tend to be very complex to design and build and therefore are, in general, very costly.

BRIEF SUMMARY OF THE INVENTION

Thus At least some inventive embodiments include an apparatus for converting DC voltage across positive and negative DC buses to three phase AC voltages on first, second and third AC output lines, the apparatus comprising a first DC link choke linked to the positive and negative DC buses and having common mode impedance, the first DC link choke including positive and negative first choke outputs, a first three phase inverter linked to the positive and negative first choke outputs and including first, second and third first inverter outputs that are linked directly to the first, second and third AC output lines at first, second and third common coupling points, respectively, the first inverter including a first subset of switches, a second DC link choke linked to the positive and negative DC buses and having common mode impedance, the second DC link choke including positive and negative second choke outputs, a second three phase inverter linked to the positive and negative second choke outputs and including first, second and third second inverter outputs that are linked directly to the first, second and third AC output lines at the first, second and third common coupling points, respectively, the second inverter including a second subset of switches and a controller for synchronously controlling the first and second inverter switch subsets so that switching of first and second inverter switch subsets is substantially synchronized among the three phases.

In some cases each of the first and second DC link chokes also includes differential mode impedance. In some cases each of the DC link chokes has common mode impedance in the range of 5%-25% of the differential mode impedance. In some cases each of the DC link chokes has differential mode impedance in the range of 10% to 14%. In some cases the first inverter is linked to the first, second and third common coupling points via cabling that has impedance of less than 1% of system base impedance and the second inverter is linked to the first, second and third common coupling points via cabling that has impedance of less than 1% of system base impedance.

Some embodiments further include at least a third DC link choke and a third three phase inverter, the third DC link choke linked to the positive and negative DC buses and having common mode impedance, the third DC link choke including positive and negative third choke outputs, the third three phase inverter linked to the positive and negative third choke outputs and including first, second and third inverter outputs that are linked directly to the first, second and third AC output lines at first, second and third common coupling points, respectively, the third inverter including a first subset of switches and, wherein, the controller synchronously controls the first, second and third inverter switch subsets so that switching of first, second and third inverter switch subsets is substantially synchronized among the three phases.

Other embodiments include an apparatus for converting DC voltage across positive and negative DC buses to three phase AC voltages on first, second and third AC output lines, the apparatus comprising a first leg including: a first three phase inverter including a first subset of inverter switches, a first choke linked in series with the first three phase inverter between the positive and negative DC buses and the AC output lines, a second leg in parallel with the first leg and including: a second three phase inverter including a second subset of inverter switches, a second choke linked in series with the second three phase inverter between the positive and negative DC buses and the AC output lines and a controller for synchronously controlling the first and second inverter switch subsets so that switching of first and second inverter switch subsets is substantially synchronized among the three phases.

In some cases the first choke includes a first DC link choke that includes common mode impedance and differential mode impedance, the first DC link choke linked to the positive and negative DC buses prior to the first inverter. In some cases the second choke includes a second DC link choke that includes common mode impedance and differential mode impedance, the second DC link choke linked to the positive and negative DC buses prior to the first inverter. In some cases each of the DC link chokes has common mode impedance in the range of 5%-25% of the differential mode impedance. In some cases each of the first and second inverters is linked to the first, second and third AC output lines at first, second and third common tie points by cabling that has impedance of less than 1% of system base impedance. In some cases the first choke includes a first common mode choke on the AC outputs of the first inverter. In some embodiments the second choke includes a second common mode choke on the AC outputs of the second inverter. In some embodiments each of the first and second common mode chokes has common mode impedance in the range of 1%-10% of system base impedance. In some embodiments the outputs of the first and second common mode chokes are linked to the first, second and third AC output lines at first, second and third common tie points by cabling that has impedance of less than 1% of system base impedance.

Still other embodiments include an apparatus for converting DC voltage across positive and negative DC buses to three phase AC voltages on first, second and third AC output lines, the apparatus comprising a first three phase inverter linked to the positive and negative DC buses and including first, second and third first inverter outputs, the first inverter including a first subset of switches, a first common mode choke linked to the first, second and third first inverter outputs and including first, second and third first choke outputs, the first, second and third first choke outputs linked to the first, second and third AC output lines at first, second and third common coupling points, respectively, a second three phase inverter linked to the positive and negative DC buses and including first, second and third first inverter outputs, the second inverter including a second subset of switches, a second common mode choke linked to the first, second and third second inverter outputs and including first, second and third second choke outputs, the first, second and third second choke outputs linked to the first, second and third AC output lines at the first, second and third common coupling points, respectively and a controller for synchronously controlling the first and second inverter switch subsets so that switching of first and second inverter switch subsets is substantially synchronized among the three phases.

In some cases each of the first and second common mode chokes has common mode impedance in the range of 1%-10% of system base impedance. In some cases the first common mode choke is linked to the first, second and third common coupling points via cabling that has impedance of less than 1% of system base impedance and the second inverter is linked to the first, second and third common coupling points via cabling that has impedance of less than 1% of system base impedance.

Yet other embodiments include a method for converting DC voltage across positive and negative DC buses to three phase AC voltages on first, second and third AC output lines, the method comprising the steps of providing first and second three phase inverters that include a first subset of inverter switches and a second subset of inverter switches, respectively, linking a first choke in series with the first three phase inverter between the positive and negative DC buses and the AC output lines, linking a second choke in series with the second three phase inverter between the positive and negative DC buses and the AC output lines and synchronously controlling the first and second inverter switch subsets so that switching of first and second inverter switch subsets is substantially synchronized among the three phases.

In some cases the step of linking a first choke includes linking a first DC link choke that includes common mode impedance and differential mode impedance to the positive and negative DC buses prior to the first inverter and wherein the step of linking a second choke includes linking a second DC link choke that includes common mode impedance and differential mode impedance to the positive and negative DC buses prior to the second inverter. In some cases each of the first and second DC link chokes includes common mode impedance in the range of 5%-25% of the differential mode impedance. In some cases the step of linking a first choke includes linking a first common mode choke between outputs of the first inverter and first, second and third common coupling points that are linked to the first, second and third AC output lines and wherein the step of linking a second choke includes linking a second common mode choke between outputs of the second inverter and the first, second and third common coupling points. In some embodiments each of the common mode chokes includes common mode impedance in the range of 1%-10% of system base impedance. To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

Referring now to the drawings wherein like reference numerals correspond to similar elements throughout the several views and, more specifically, referring to FIG. 1, the present invention will be described in the context of an exemplary power conversion system 10a that receives power from three AC supply lines collectively identified by numeral 20 and provides three phase AC power to a motor 18 via first, second and third AC output lines 40, 42 and 44, respectively. As shown, system 10a includes a rectifier 12 and first and second parallel system legs 21 and 23. As well known, rectifier 12 receives three phase AC input voltages on supply lines 20 and converts those AC voltages to a DC potential across positive and negative DC rails or buses 22 and 24, respectively.

Figure 1:
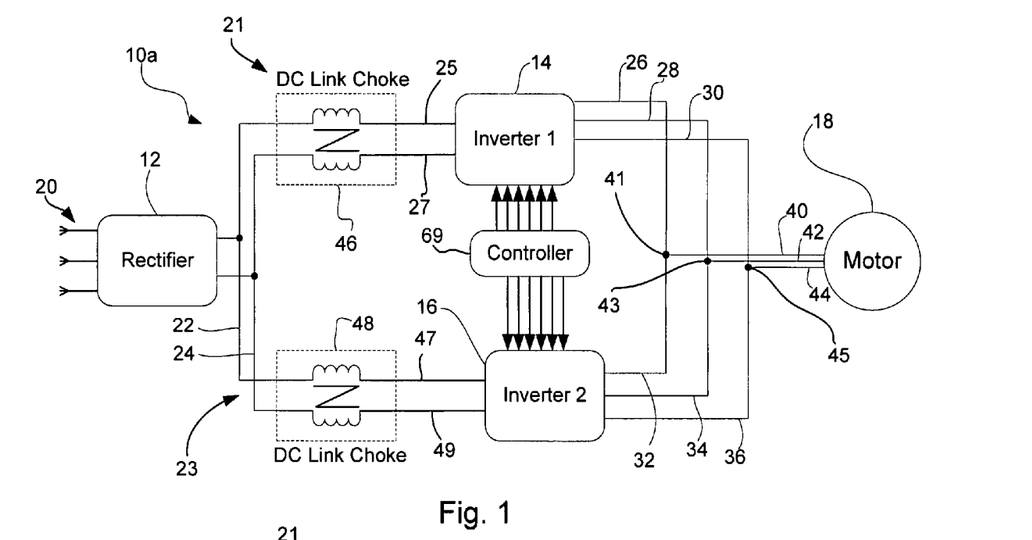
FIG. 1 is a schematic illustrating a power conversion assembly according to a first inventive embodiment.

Referring still to FIG. 1, first system leg 21 includes a first DC line choke 46, a first three phase inverter 14 and cables 26, 28 and 30. First choke 46 is magnetically linked to positive and negative DC buses 22 and 24, respectively, and includes first and second first choke outputs 25 and 27, respectively. First choke 46 has both common mode and differential mode impedance for limiting high frequency circulating currents between inverters 14 and 16. The first choke outputs 25 and 27 are provided to first inverter 14. As well known in the power conversion arts, inverter 14 includes six switching devices arranged in three device paris, each pair including two series switches, the switches in each pair linked at a central node where each central node is provided as an inverter output. Each pair of switches extends between positive and negative inputs to the inverter. In FIG. 1, the positive and negative inputs to inverter 14 include outputs 25 and 27 from choke 46. Thus, each pair of switching devices in inverter 14 extends between choke outputs 25 and 27. The first, second and third outputs of inverter 14 are linked via cables 26, 28 and 30 to the first, second and third lines 40, 42 and 44, respectively, at first, second and third coupling points 41, 43 and 45, respectively.

Referring still to FIG. 1, second system leg 23 includes a second DC link choke 48, a second inverter 23 and a second set of first, second and third cables 32, 34 and 36, respectively. Second choke 48 is linked to positive and negative DC rails 22 and 24, respectively and has first and second second choke outputs 47 and 49 which are fed to second inverter 16. Second choke 48, like first choke 46, has both common mode and differential mode impedance for limiting high frequency circulating currents between inverters 14 and 16. Inverter 16 is constructed in a similar fashion to first inverter 14 and therefore will not be described here in detail. Here, it should suffice to say that inverter 16 has first, second and third outputs that are linked to cables 32, 34 and 36, respectively, where cables 32, 34 and 36 are linked to the first, second and third common coupling points 41, 43 and 45, respectively.

Referring yet again to FIG. 1, system 10a also includes a synchronous PWM controller 69 that is linked to each of inverters 14 and 16 for providing control signals to the subsets of switches that comprise the inverters 14 and 16. Here, as implied by the label "synchronous PWM", controller 69 synchronously controls the first and second switch subsets in inverters 14 and 16. To this end, controller 16 provides identically timed control signals to each of the switch pairs in inverters 14 and 16 that are linked to output cables 26 and 32, provides identically timed signals to each of the switch pair in inverters 14 and 16 that are linked to cables 28 and 34 and provides identically timed signals to each of the switch pairs linked to cables 30a and 36.

Referring still to FIG. 1, the cabling 26, 28 and 30 and cabling 32, 34 and 36 has some inherent inductance represented by numerals 37 and 38 where the amount of cabling related inductance is a function of cable length. In the present case, the DC choke is extremely effective to minimize circulating common-mode currents. In addition, because of the synchronous switching, the circulating differential-mode currents at the inverter output are limited, and a system user is free to select cables 26, 28, 30, 32, 34 and 36 having virtually any desirable length including very short cables.

Figure 3:
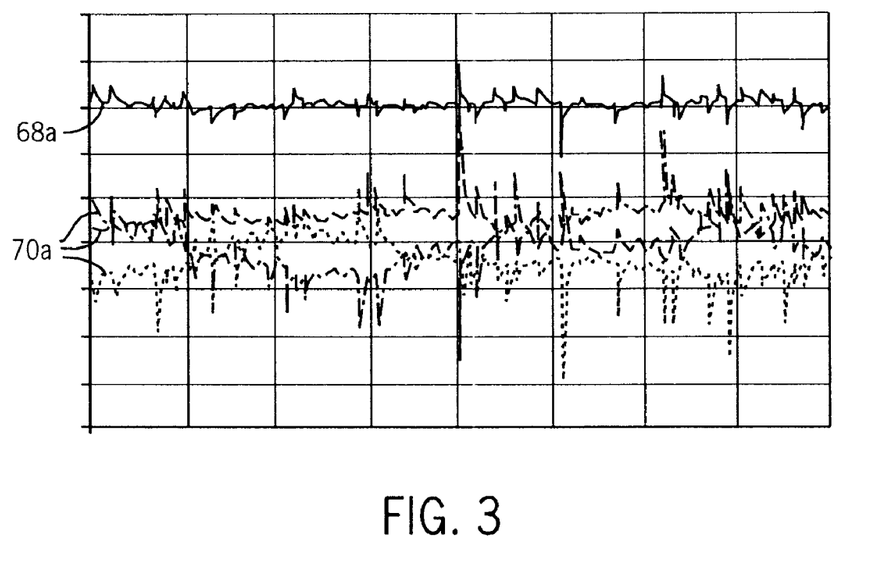
FIG. 3 is a graph that includes waveforms showing common mode and differential mode AC outputs circulating currents that were derived using a parallel inverter adjustable speed drive that did not include the inventive choke configurations.
Figure 4:
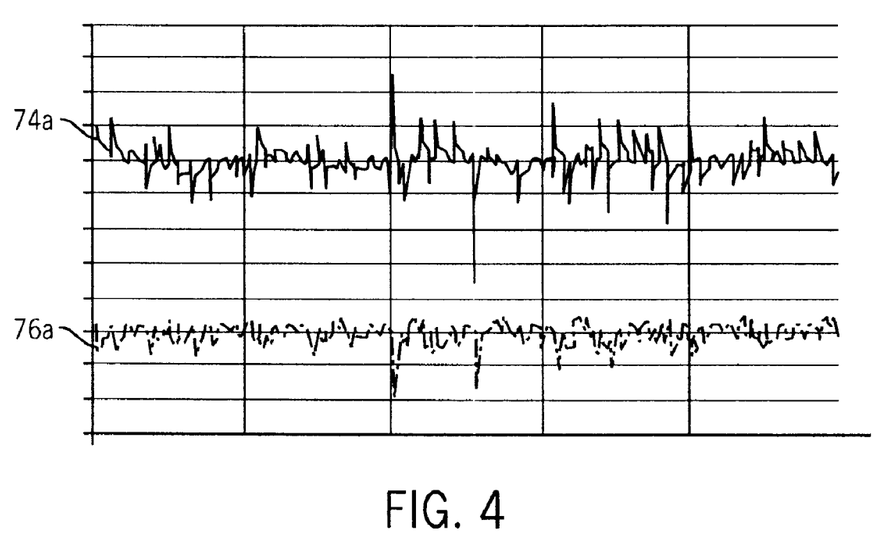
FIG. 4 is a plot including waveforms representing common mode and differential mode DC links circulating currents derived using a parallel inverter adjustable speed drive that did not include one of the inventive choke configurations.

Referring now to FIGS. 3 and 4, exemplary circulating current waveforms 68a, 70a, 74a and 76a are illustrated that were derived using a parallel inverter adjustable speed drive without including a choke of any kind for limiting circulating currents. Specifically, referring to FIG. 3, waveform 68a represent a common mode AC output circulating current while the three waveforms collectively identified by numeral 70a represent differential mode AC output circulating currents in the three phases. As can be seen, the common mode circulating current 68a varies appreciably during the time period shown. Similarly, the differential mode circulating currents 70a vary appreciably and have relatively high peak values periodically. In FIG. 4, waveform 74a represents a common mode DC link circulating current while waveform 76a represents a differential mode DC link circulating current. Once again, each of the common and differential mode DC link currents vary appreciably and spike periodically.

Figure 5:
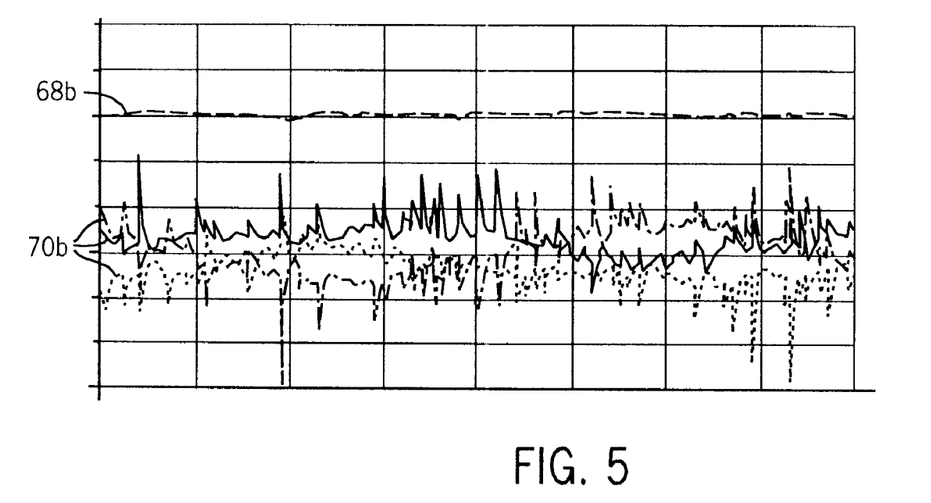
FIG. 5 is similar to FIG. 3, albeit including waveforms derived using a parallel inverter adjustable speed drive configured like the drive shown in FIG. 1.
Figure 6:
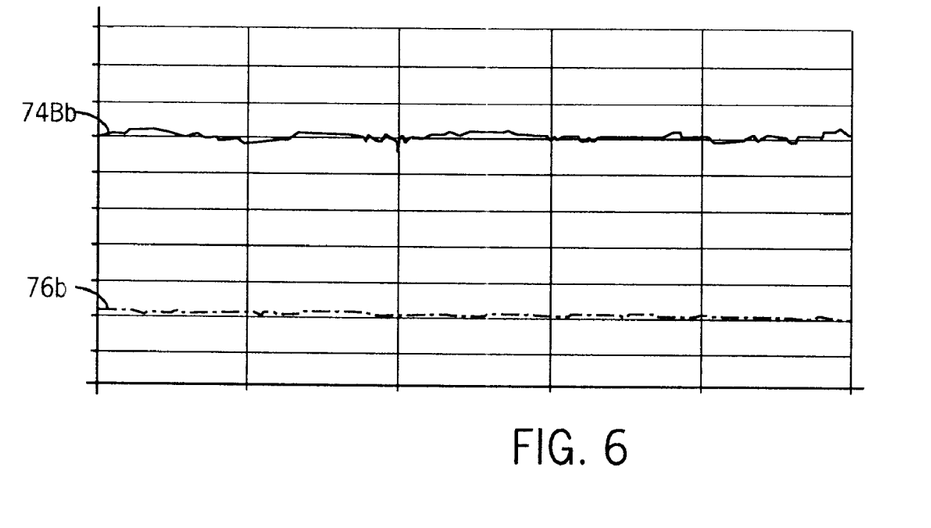
FIG. 6 is similar to FIG. 4, albeit including waveforms derived using a parallel inverter adjustable speed drive having the configuration shown in FIG. 1.

Referring now to FIGS. 5 and 6, waveforms similar to those described above with respect to FIGS. 3 and 4 are shown, albeit having been derived using a parallel inverter adjustable speed drive including DC link chokes to limit circulating currents as shown in FIG. 1. Referring specifically to FIG. 5 and also again to FIG. 3, it can be seen that when DC link chokes (see 46 and 48 in FIG. 1) are included in system 10a, the common mode AC output circulating current 68b is maintained at an approximately zero value. In addition, the differential mode AC output circulating currents 70b, while still erratic, exhibits substantially reduced spiking activity. Referring to FIG. 6 and again also to FIG. 4, when DC link chokes are included in a system, the common mode DC link circulating current 76b is substantially maintained at a zero value and, similarly, the differential mode DC link circulating currents 76b are also maintained at essentially a zero value.

Thus, the DC link chokes shown in FIG. 1 can be used to eliminate the requirement for large magnetic structures at the output ends of parallel inverters. To this end, the overall space and materials required to accommodate and construct two DC link chokes 46 and 48 are substantially less than the space and materials required to construct inverter output structures. DC link chokes are typically used in motor drives to filter and smooth the AC input voltage, reduce the harmonic content in the input AC currents, and protect the motor drive from transients in the AC input voltage. Moreover, DC link chokes can be designed to provide common-mode impedance, in addition to differential-mode impedance, to limit circulating currents in parallel inverters.

Figure 2:
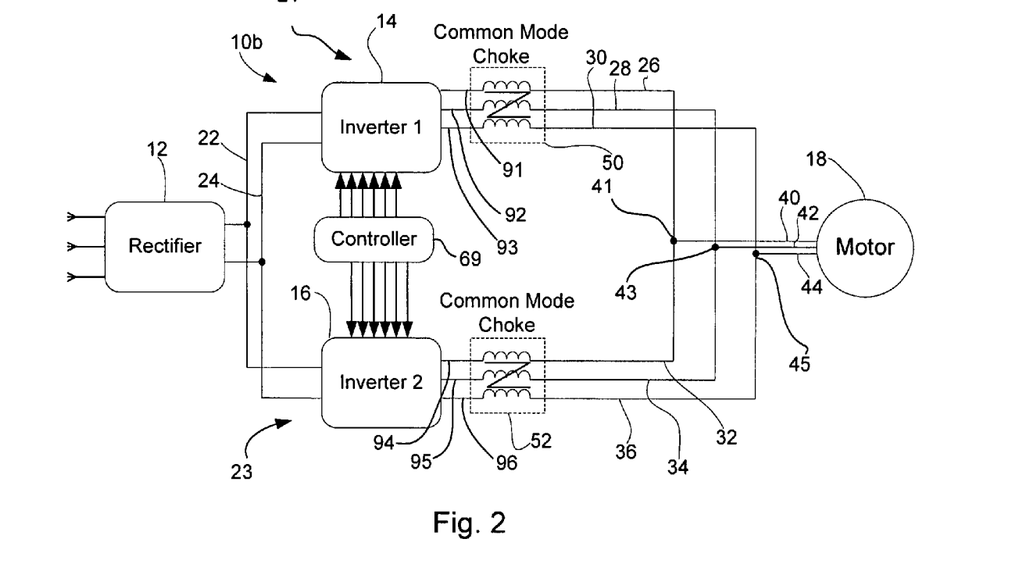
FIG. 2 is a schematic illustrating a power conversion assembly according to a second inventive embodiment.

Referring now to FIG. 2, a second inventive embodiment 10b is illustrated. In the embodiment shown in FIG. 2, many of the components illustrated are identical and operate in the same fashion as components in the embodiment of FIG. 1 and therefore, in the interest of simplifying this explanation, those components will not again be described here in detail. The primary differences between system 10a in FIG. 1 and system 10b in FIG. 2 are that, each of first and second inverters 14 and 16 in FIG. 2 is linked directly to the positive and negative DC buses 22 and 24, first, second and third first inverter 14 outputs 91, 92 and 93 are provided to a first AC common mode choke 50 and first, second and third second inverter 16 outputs 94, 95 and 96 are provided to second AC common mode choke 52. As in system 10a of FIG. 1, system 10b includes a synchronous PWM controller 69 for, as the label implies, synchronously controlling switching of first and second inverter switch subsets that comprise first and second inverters 14 and 16, respectively. Here, chokes 50 and 52 together with synchronous switching of inverter switches minimize circulating currents so effectively that inherent cable inductance 37 and 38 is essentially unnecessary and therefore cables 26, 28, 30, 32, 34 and 36 may have extremely short lengths.

Figure 7:
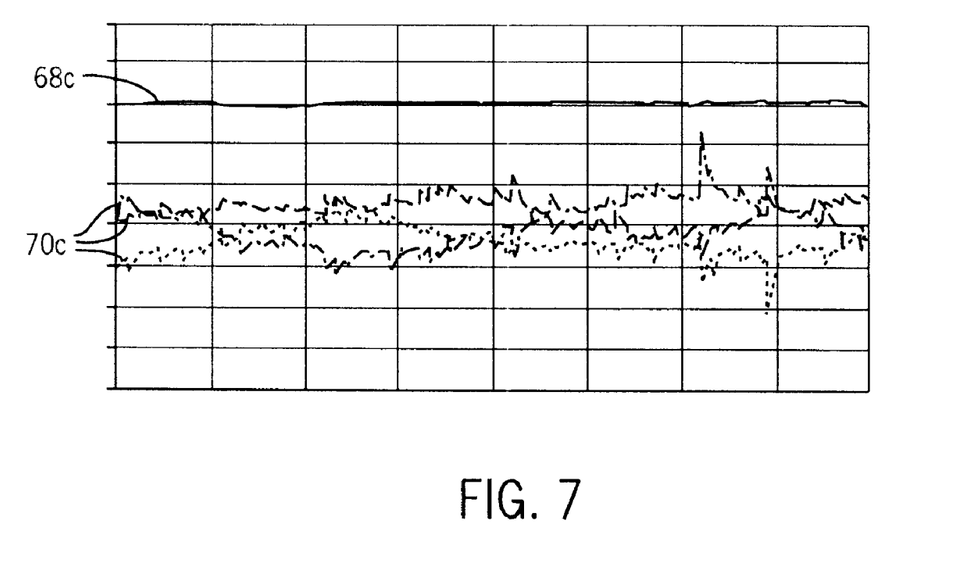
FIG. 7 is a graph similar to the graph shown in FIG. 3, albeit including waveforms derived using a parallel inverter adjustable speed drive having the configuration shown in FIG. 2.
Figure 8:
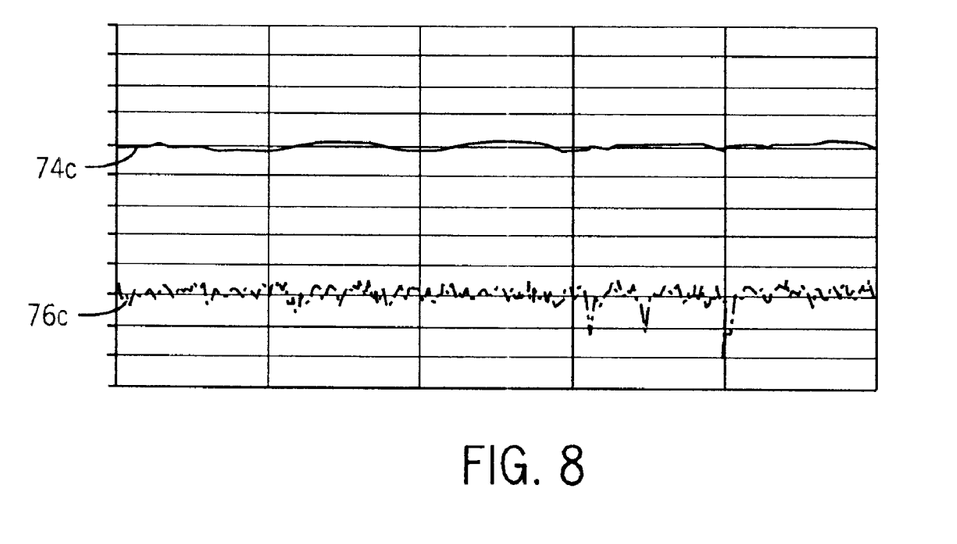
FIG. 8 is a graph similar to FIG. 4, albeit showing waveforms derived using a parallel inverter adjustable speed drive having the configuration shown in FIG. 2.

Referring now to FIGS. 7 and 8, waveforms similar to those described above with respect to FIGS. 3 and 4 are shown, albeit where the waveforms were generated using a parallel inverter adjustable speed drive including AC common mode chokes like chokes 50 and 52 shown in FIG. 2. As seen in FIGS. 7 and 8, the common mode AC output circulating current and common mode DC link circulating current 68c and 74c, respectively, have been reduced to an approximately zero value. While the differential mode AC output circulating current and DC link circulating current 70c and 76c, respectively, still have some variability, they have less variability than the corresponding waveforms 70a and 76a shown in FIGS. 3 and 4 above.

In the case of embodiment 10b (see FIG. 2), despite the fact that chokes 50 and 52 are at the output ends of inverters 14 and 16, because inverters 14 and 16 are synchronously controlled, the circulating current levels are reduced and therefore the overall size of each AC choke 50 and 52 can be reduced somewhat. Moreover, common-mode chokes 50 and 52 are physically small in size because they do not saturate on differential-mode currents. Common-mode chokes also provide a certain small value of impedance in differential-mode, which helps to reduce the differential-mode circulating currents at the inverter output.

One or more specific embodiments of the present invention have been described above. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Thus, the invention is to cover all modifications, equivalents, and alternatives falling within the spirit and scope of the invention as defined by the following appended claims. For example, in the case of the FIG. 2 embodiment, in at least some applications it may be advantageous to provide a DC link choke with only differential mode inductance, depending on the type of rectifier employed in the configuration. As another example, in the case of the FIG. 2 embodiment, in at least some applications it may be advantageous to provide an AC differential-mode choke on the input side of the rectifier, and without a DC link choke.

To apprise the public of the scope of this invention, the following claims are made:

What is claimed is:

1. An apparatus for converting DC voltage across positive and negative DC buses to three phase AC voltages on first, second and third AC output lines, the apparatus comprising:
a first DC link choke linked to the positive and negative DC buses and having common mode impedance, the first DC link choke including positive and negative first choke outputs;
a first three phase inverter linked to the positive and negative first choke outputs and including first, second and third first inverter outputs that are linked directly to the first, second and third AC output lines at first, second and third common coupling points, respectively, the first inverter including a first subset of switches;
a second DC link choke linked to the positive and negative DC buses and having common mode impedance, the second DC link choke including positive and negative second choke outputs;
a second three phase inverter linked to the positive and negative second choke outputs and including first, second and third second inverter outputs that are linked directly to the first, second and third AC output lines at the first, second and third common coupling points, respectively, the second inverter including a second subset of switches; and
a controller for synchronously controlling the first and second inverter switch subsets so that switching of first and second inverter switch subsets is substantially synchronized among the three phases.

2. The apparatus of claim 1 wherein each of the first and second DC link chokes also includes differential mode impedance.

3. The apparatus of claim 2 wherein each of the DC link chokes has common mode impedance in the range of 5%-25% of the differential mode impedance.

4. The apparatus of claim 3 wherein each of the DC link chokes has common mode impedance in the range of 10% to 14%.

5. The apparatus of claim 1 wherein the first inverter is linked to the first, second and third common coupling points via cabling that has impedance of less than 1% of system base impedance and the second inverter is linked to the first, second and third common coupling points via cabling that has impedance of less than 1% of system base impedance.

6. The apparatus of claim 1 further including at least a third DC link choke and a third three phase inverter, the third DC link choke linked to the positive and negative DC buses and having common mode impedance, the third DC link choke including positive and negative third choke outputs, the third three phase inverter linked to the positive and negative third choke outputs and including first, second and third third inverter outputs that are linked directly to the first, second and third AC output lines at first, second and third common coupling points, respectively, the third inverter including a first subset of switches and, wherein, the controller synchronously controls the first, second and third inverter switch subsets so that switching of first, second and third inverter switch subsets is substantially synchronized among the three phases.

7. An apparatus for converting DC voltage across positive and negative DC buses to three phase AC voltages on first, second and third AC output lines, the apparatus comprising:
a first leg including:
a first three phase inverter including a first subset of inverter switches;
a first choke linked in series with the first three phase inverter between the positive and negative DC buses and the AC output lines;
a second leg in parallel with the first leg and including:
a second three phase inverter including a second subset of inverter switches;
a second choke linked in series with the second three phase inverter between the positive and negative DC buses and the AC output lines; and
a controller for synchronously controlling the first and second inverter switch subsets so that switching of first and second inverter switch subsets is substantially synchronized among the three phases.

8. The apparatus of claim 7 wherein the first choke includes a first DC link choke that includes common mode impedance and differential mode impedance, the first DC link choke linked to the positive and negative DC buses prior to the first inverter.

9. The apparatus of claim 8 wherein the second choke includes a second DC link choke that includes common mode impedance and differential mode impedance, the second DC link choke linked to the positive and negative DC buses prior to the first inverter.

10. The apparatus of claim 9 wherein each of the DC link chokes has common mode impedance in the range of 5%-25% of the differential mode impedance.

11. The apparatus of claim 10 wherein each of the first and second inverters is linked to the first, second and third AC output lines at first, second and third common tie points by cabling that has impedance of less than 1% of system base impedance.

12. The apparatus of claim 7 wherein the first choke includes a first common mode choke on the AC outputs of the first inverter.

13. The apparatus of claim 12 wherein the second choke includes a second common mode choke on the AC outputs of the second inverter.

14. The apparatus of claim 13 wherein each of the first and second common mode chokes has common mode impedance in the range of 1%-10% of system base impedance.

15. The apparatus of claim 14 wherein the outputs of the first and second common mode chokes are linked to the first, second and third AC output lines at first, second and third common tie points by cabling that has impedance of less than 1% of system base impedance.

16. An apparatus for converting DC voltage across positive and negative DC buses to three phase AC voltages on first, second and third AC output lines, the apparatus comprising:
a first three phase inverter linked to the positive and negative DC buses and including first, second and third first inverter outputs, the first inverter including a first subset of switches;
a first common mode choke linked to the first, second and third first inverter outputs and including first, second and third first choke outputs, the first, second and third first choke outputs linked to the first, second and third AC output lines at first, second and third common coupling points, respectively;
a second three phase inverter linked to the positive and negative DC buses and including first, second and third first inverter outputs, the second inverter including a second subset of switches;
a second common mode choke linked to the first, second and third second inverter outputs and including first, second and third second choke outputs, the first, second and third second choke outputs linked to the first, second and third AC output lines at the first, second and third common coupling points, respectively; and
a controller for synchronously controlling the first and second inverter switch subsets so that switching of first and second inverter switch subsets is substantially synchronized among the three phases.

17. The apparatus of claim 16 wherein each of the first and second common mode chokes has common mode impedance in the range of 1%-10% of system base impedance.

18. The apparatus of claim 17 wherein the first common mode choke is linked to the first, second and third common coupling points via cabling that has impedance of less than 1% of system base impedance and the second inverter is linked to the first, second and third common coupling points via cabling that has impedance of less than 1% of system base impedance.

19. A method for converting DC voltage across positive and negative DC buses to three phase AC voltages on first, second and third AC output lines, the method comprising the steps of:
providing first and second three phase inverters that include a first subset of inverter switches and a second subset of inverter switches, respectively;
linking a first choke in series with the first three phase inverter between the positive and negative DC buses and the AC output lines;
linking a second choke in series with the second three phase inverter between the positive and negative DC buses and the AC output lines; and
synchronously controlling the first and second inverter switch subsets so that switching of first and second inverter switch subsets is substantially synchronized among the three phases.

20. The method of claim 19 wherein the step of linking a first choke includes linking a first DC link choke that includes common mode impedance and differential mode impedance to the positive and negative DC buses prior to the first inverter and wherein the step of linking a second choke includes linking a second DC link choke that includes common mode impedance and differential mode impedance to the positive and negative DC buses prior to the second inverter.

21. The method of claim 20 wherein each of the first and second DC link chokes includes common mode impedance in the range of 5%-25% of the differential mode impedance.

22. The method of claim 19 wherein the step of linking a first choke includes linking a first common mode choke between outputs of the first inverter and first, second and third common coupling points that are linked to the first, second and third AC output lines and wherein the step of linking a second choke includes linking a second common mode choke between outputs of the second inverter and the first, second and third common coupling points.

23. The method of claim 22 wherein each of the common mode chokes includes common mode impedance in the range of 1%-10% of system base impedance.

* * * * *